July 28, 1959  J. O. EAMES  2,896,764
DOOR CLOSING AND ACTUATING MECHANISM FOR PARKING METERS
Original Filed June 30, 1949  4 Sheets-Sheet 1

INVENTOR
James O. Eames
BY
Burgess Ryan & Hicks
ATTORNEYS

July 28, 1959     J. O. EAMES     2,896,764
DOOR CLOSING AND ACTUATING MECHANISM FOR PARKING METERS
Original Filed June 30, 1949     4 Sheets-Sheet 2
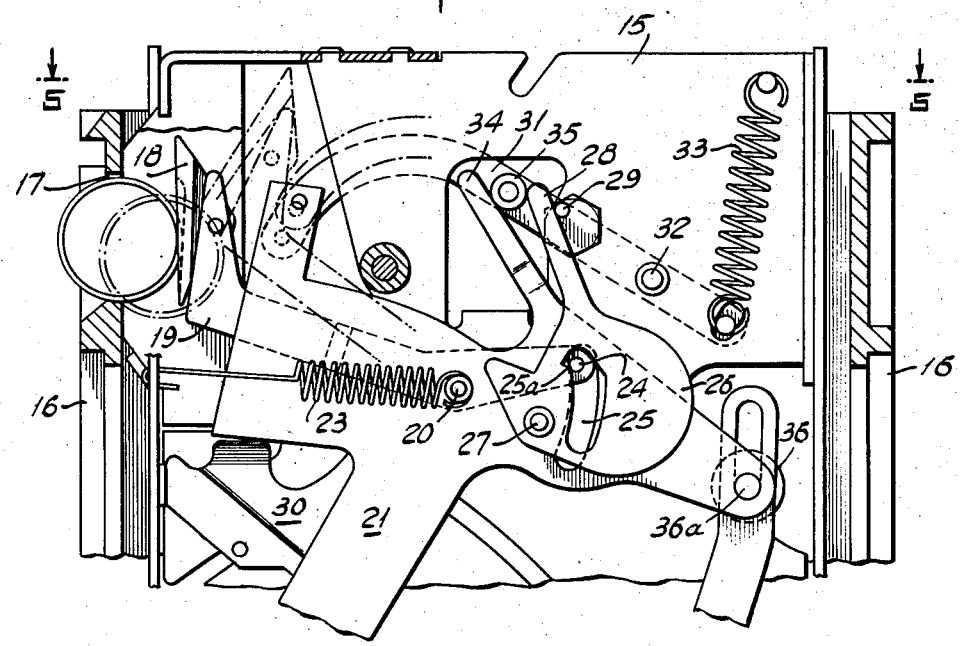
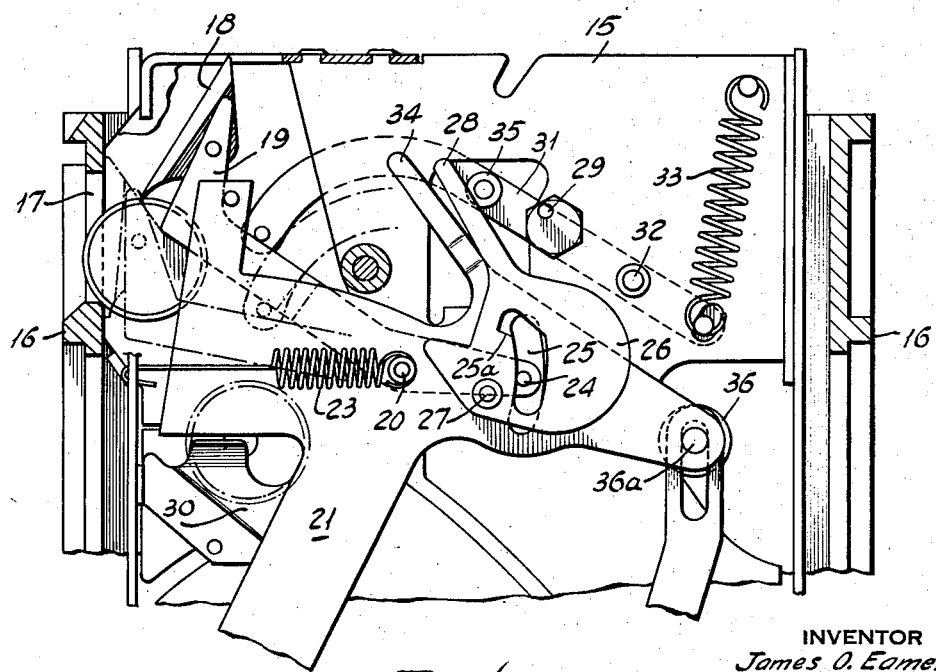
INVENTOR
James O. Eames
BY
ATTORNEYS July 28, 1959  J. O. EAMES  2,896,764
DOOR CLOSING AND ACTUATING MECHANISM FOR PARKING METERS
Original Filed June 30, 1949  4 Sheets-Sheet 3
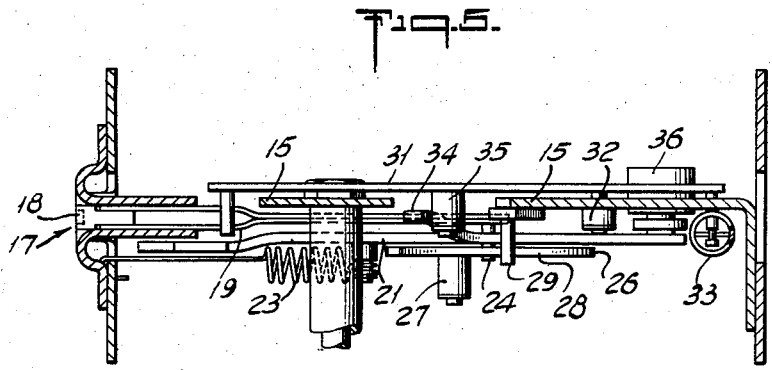
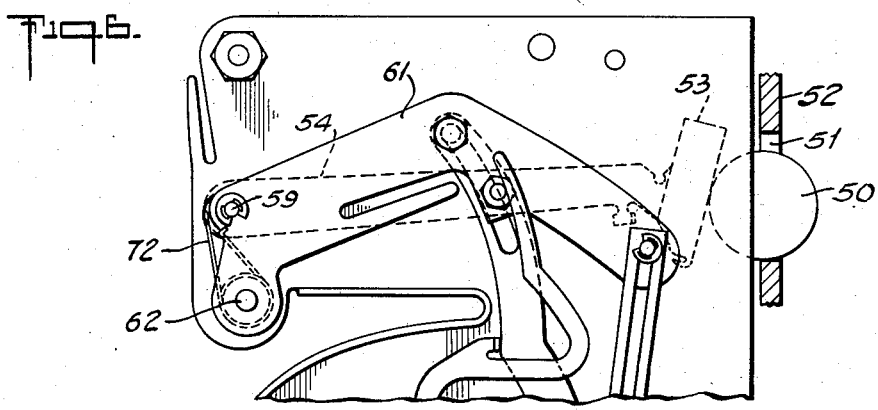
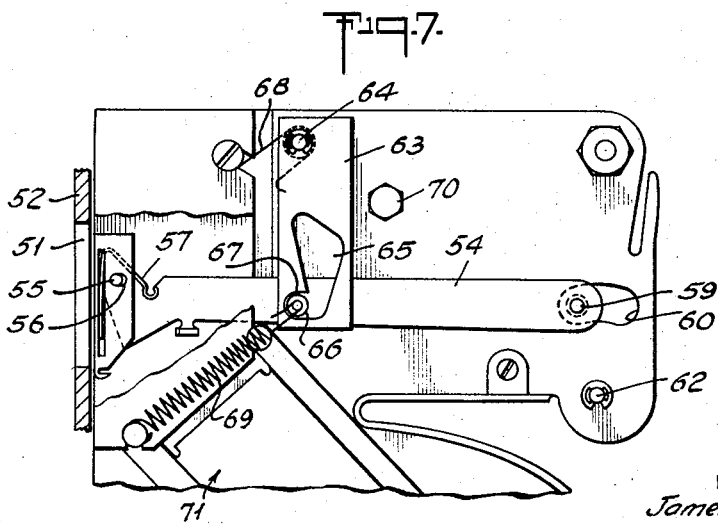
INVENTOR
James O. Eames
BY
Burgess, Ryan & Hicks
ATTORNEYS July 28, 1959            J. O. EAMES            2,896,764
DOOR CLOSING AND ACTUATING MECHANISM FOR PARKING METERS
Original Filed June 30, 1949            4 Sheets-Sheet 4
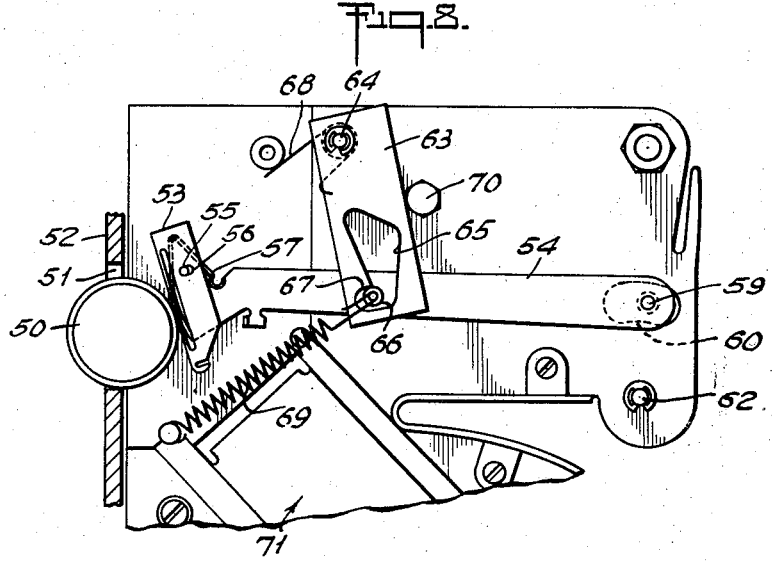
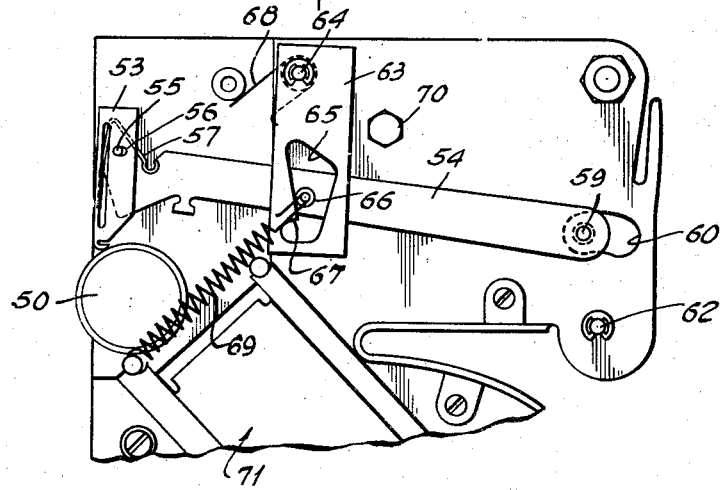
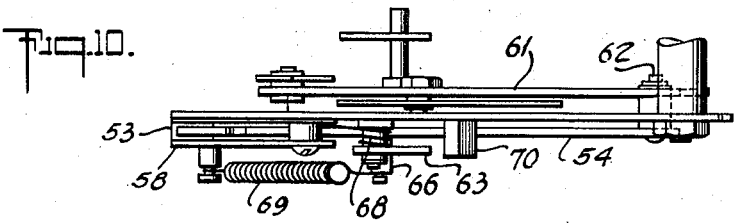
INVENTOR
James O. Eames
BY
ATTORNEYS United States Patent Office 2,896,764
Patented July 28, 1959

2,896,764

DOOR CLOSING AND ACTUATING MECHANISM FOR PARKING METERS

James O. Eames, Washington, Conn., assignor to The Michaels Art Bronze Company, Incorporated, Covington, Ky., a corporation of Kentucky Original application June 30, 1949, Serial No. 102,189, now Patent No. 2,721,641, dated October 25, 1955. Divided and this application August 18, 1955, Serial No. 529,286

8 Claims. (Cl. 194—72)

The present invention relates to vehicle parking meters and relates, more particularly, to a door closing and actuating mechanism for parking meters.

The present application is a division of my copending application for Letters Patent Serial No. 102,189, filed June 30, 1949, entitled Parking Meter Mechanism on which U.S. Patent No. 2,721,641 issued October 25, 1955.

In particular, the invention relates to parking meters of the type where a coin is deposited for the purchase of a specified period of parking. Such meters have, in general, been designated as either manual or automatic meters in accordance with the commonly understood and accepted meaning of such terms. Briefly, the manual type of meter is one that requires that a parker perform some act in addition to the deposit of a coin in order to place the meter in operation, whereas the automatic type of meter is one that requires only the deposit of a coin by the parker to place the meter in operation.

While the present invention has particular application to automatic meters, it will be understood that the invention is not limited to automatic meters and may be applied to manual or other types of meters if desired.

A meter in which the present invention may be used is also illustrated and described in United States Letters Patent No. 2,628,699 issued February 17, 1953 in the names of Roy S. Sanford and James O. Eames for Parking Meter Mechanisms.

An object of the invention is to provide a substantially weatherproof closure for the coin entrance slot and a simple, but efficient coin operated mechanism for operating the meter in association with the coin slot closing mechanism.

These objects and advantages of the invention and various other objects and advantages of the invention will be apparent and best understood by reference to the following description and the accompanying drawings in which:

Figs. 3 and 4 are side views in partial section of a portion of the mechanism shown in Fig. 2, but with the parts in different operating positions;

Fig. 5 is a section view taken along the line 5—5 of Fig. 3 but omitting the meter housing;

Fig. 6 is a side elevation from the front illustrating a modified form of a door closing and actuating mechanism embodying the invention;

Fig. 7 is a side elevation from the rear of the mechanism illustrated in Fig. 6;

Figs. 8 and 9 are views corresponding to Fig. 7 with the parts in different operating positions; and Fig. 10 is a top view of the mechanism illustrated in Figs. 7 through 9.

Figure 1:
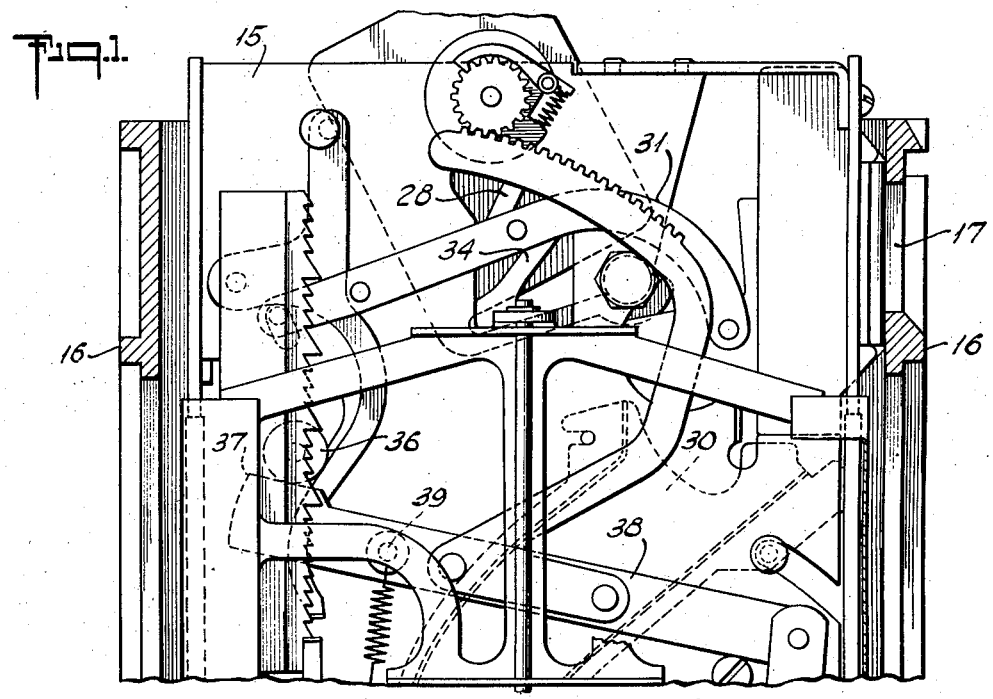
Fig. 1 is a side elevation in partial section taken from the front of a door closing and actuating mechanism embodying the invention.

Referring to the drawings in detail, the door closing and actuating mechanism along with other parts of the meter mechanism are supported on a chassis plate 15 with the various parts of the mechanism being mounted on both sides thereof. As shown in Fig. 1, the chassis plate and the mechanism assembled thereon are enclosed within a housing 16 of the usual weatherproof construction. The chassis plate 15 with the meter mechanism supported thereon may be removable from the housing as a unit for ease in repair or replacement. The housing 16 is supported in the usual manner by a post (not shown) which is located at an appropriate position in relation to a parking space.

Figure 2:
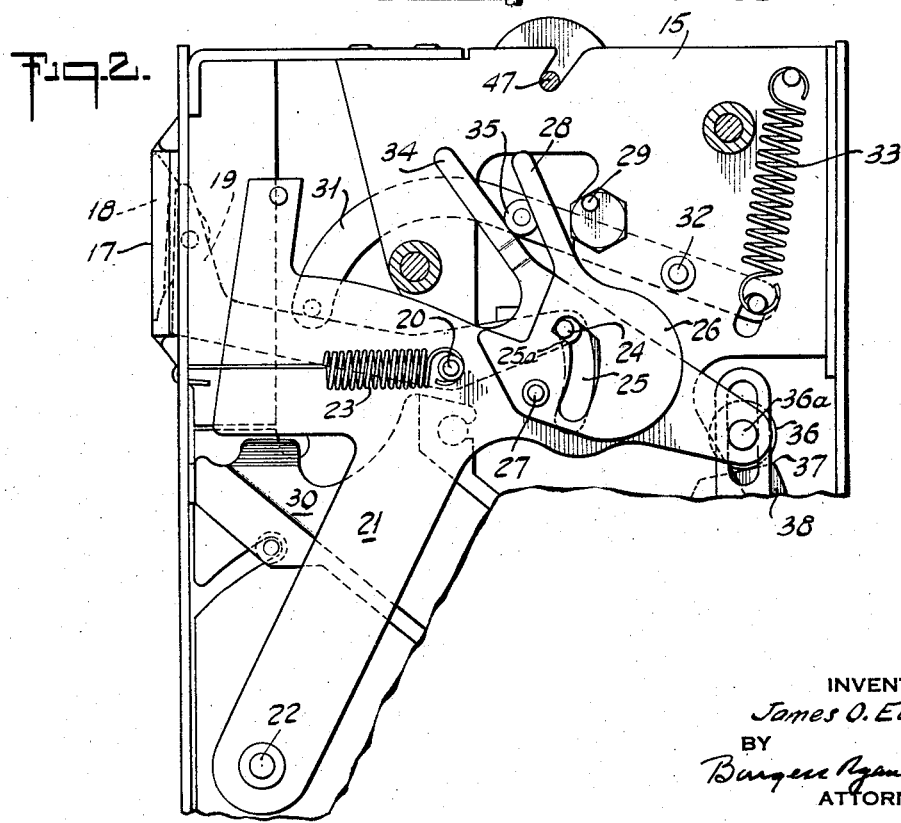
Fig. 2 is a side elevation in partial section taken from the rear of the door closing and actuating mechanism illustrated in Fig. 1 with the meter housing being omitted.

The housing 16 has a coin slot 17 through which a coin may be inserted edgewise by the parker. The coin slot 17 is normally closed by a door 18 that is yieldably pressed against the coin slot from the inside of the housing. The door 18 is pivotally supported between the bifurcated arms of a door-supporting strut 19. The pivotal mounting of the door 18 permits the door to fit flush against the housing to make a tight, weatherproof seal at the coin slot opening and it also permits the door 18 to assume a directly opposed position relative to a coin that is inserted in the coin slot. The door-supporting strut 19 is pivoted at 20 on an actuator lever 21. The actuator lever 21 is in turn pivoted on the chassis plate 15 at 22 (see Fig. 2) and is resiliently urged in a door closing direction by an actuator spring 23. Thus, upon insertion of a coin in the coin slot 17, the door 18 is forced inward by the pressure exerted against the coin. This moves the door-supporting strut 19 and the actuator lever 21 first to the position shown in Fig. 4. During its movement to this position, the door-supporting strut 19 is held against movement relative to the actuator lever 21 by a pin 24 which is carried by the door strut and engages with a notch 25a in a slot 25 in a door latch 26.

The door latch 26 is pivoted at 27 on the actuator lever 21 and has an arm 28 which engages with a latch releasing pin 29 that is adjustably mounted on the chassis plate 15. When the door supporting strut 19 and the actuator lever 21 are moved back by the coin to a point where the arm 28 of the door latch 26 strikes the adjustable latch release pin 29, the door latch 26 pivots about the point 27 and disengages the notch 25a in the slot 25 from the pin 24. This permits the door supporting strut then to swing upwardly to the position shown in Fig. 4 so that the coin being inserted may pass freely into a coin chute 30. When this occurs, the door 18 and the actuator lever 21 are released and the door 18 returns to its slot closing position as shown by the dot and dash lines in Fig. 4.

In the return movement, the door 18 is urged downwardly toward its slot closing position by a door closer lever 31. The door closer lever 31 is pivoted at 32 on the chassis plate 15 and is urged into engagement with the door supporting strut 19 to hold the door in door closing position by a door closing spring 33 that is connected to the free end thereof. When a coin is pushed into the coin slot 17 forcing the actuator lever 21 inward, an arm 34 extending from the actuator lever 21 engages with a roller 35 on the door closer lever 31 and raises the door closing lever 31 from engagement with the door strut 19 as indicated in Fig. 3. Thus, the door closer lever 31 will not interfere with the door supporting strut 19 swinging upward when the door latch 26 is released. However, when the coin passes into the coin chute 30, the actuator spring 23 returns the actuator lever 21 to its initial position and carries the arm 34 out of engagement with the roller 35 permitting the door closer 31 to reengage with the door strut 19 and return the door 18 positively to its slot closing position under the force of the door closer spring 33. The door latch arm 28 is also released from the stop 29 and the pin 24 re-engages with the notch 25a in the slot 25 in the door latch 26 upon this movement of the actuator prior to insertion of the next coin.

The operation of the mechanism which has just been described following the release of a coin, is positive and takes place very rapidly. If for any reason the coin does not pass freely down the coin chute 30, the return of the door 18 to slot closing position has a tendency to kick the coin down the coin chute 30 in addition to providing a positive weatherproof closure for the coin slot 17.

The actuator lever 21 carries a roller 36 mounted on a pin 36a located at one end of the actuator lever 21 and extending therefrom. The pin 36a projects through an aperture in the chassis plate 15 at one side thereof and the roller 36 engages with a cam surface 37 on one end of an intermediate lever 38. When a coin is pushed against the door 18 forcing the door supporting strut 19 and the actuator 21 rearward, as previously described, the roller 36 at the end of the actuator lever 21 moves downward in an arcuate path about the actuator pivot point 22. The downward movement of the roller 36 in this manner brings the roller 36 into engagement with the cam surface 37 on the intermediate lever 38 as shown best in Fig. 1. The intermediate lever 38 is secured to a rock shaft 39 that is rotatably supported on the chassis plate 15 so that the downward movement of the roller 36 forces the cam end of the intermediate lever down and raises the other end of the intermediate lever.

The remainder of the meter mechanism and its operation are fully described in my copending application Serial No. 102,189 filed June 30, 1949, now Patent No. 2,721,641, of which this application is a division, and such description need not be repeated here.

The operation of the mechanism that has been described above will now be briefly summarized. When a coin is inserted edgewise through the coin slot 17 and is pushed against the door 18, the door-supporting strut 19 and the actuator lever 21 are forced inward. The resulting movement of the actuator lever 21 cocks the meter mechanism for operation and it also raises the door closing lever 31 from engagement with the door-supporting strut 19. As the thrust of the coin completes the inward movement of the actuator lever 21, the latch 26 securing the door strut 19 to the actuator lever 21 is released permitting the door strut 19 to swing upwardly so that the coin may drop into the coin chute 30. When the coin drops into the coin chute 30 the actuator lever 21 is returned to its initial position by the actuator spring 23 and the door-supporting strut 19 with the door 18 are also returned to their initial positions by the door closer 31 and the door closer spring 33 at which time the door latch 26 is re-engaged.

The modified form of door closing and actuating mechanism illustrated in Figs. 6 through 10 will now be described. This mechanism is also shown and described but not claimed in the copending application Serial No. 377,933 filed September 1, 1953, now Patent No. 2,831,557, issued April 22, 1958 in the names of James O. Eames and Cecil H. Taylor and entitled "Parking Meter."

Referring to Figs. 6 and 8, which illustrate the face and rear of a modified form of door closing and actuating mechanism, respectively, a coin 50 upon being inserted through a coin slot 51 in the housing or case 52 contacts with the forward face of a coin door 53 which is pivotally mounted on the forward end of a strut 54 by means of a pin 55 positioned above the center line of the coin slot. The pin 55 extends through the door and through slotted openings 56 in the sides of the door. A spring 57 resiliently urges the door into engagment with the case so as to close the coin slot and the limited movement of the door on the strut which is permitted by the slots 56 compensates for slight variations that may exist in respect to the location of the meter mechanism relative to the case.

The coin door 53 and the forward end of the strut project through a coin-receiving passageway which is formed by the chassis plate and a guide plate 58 (see Fig. 10) and communicates with the coin slot in the case. The guide plate 58 is removably secured to the chassis plate so that the coin-receiving passageway can be readily cleared of any obstruction therein.

The strut 54 extends across the rear face of the chassis plate and is pivotally mounted on a pin 59 which extends through an arcuate slot 60 in the chassis plate and is secured to an actuator lever 61. The actuator lever 61 is located on the front face of the chassis plate and is pivoted on a pin 62 at the rear edge thereof. The actuator lever has an arm which extends toward the front edge of the chassis plate which is raised and lowered as the actuator lever is rocked about its pivot.

When the coin door and strut are in their forward position, as shown in Fig. 7, the strut is held against rotation relative to the actuator lever by a latch mechanism consisting of a latch member 63 which is pivotally mounted on a pin 64 carried by the chassis plate. The latch member 63 has an opening 65 therein through which a roller 66 carried by the strut extends for engagement with a latching surface 67 defined by the opening. A spring 68 urges the latch in a direction to engage the latching surface with the roller on the strut and a tension spring 69 connected between the chassis plate and the roller on the strut urges the strut to its forward position.

The insertion of a coin through the coin slot swings the coin door about its pivot point, as indicated in Fig. 8, and forces the strut rearwardly. The rearward movement of the strut, which is guided by the latch and the actuator lever, causes the actuator lever to be rocked in a counter-clockwise direction (as seen in Fig. 6) about its pivot pin 62 which raises the forward end of the actuator lever. As the strut approaches the rearward limit of its travel, the latch 63 comes into contact with an adjustable eccentric or stop 70 on the chassis plate which prevents further rearward movement of the latch with the strut. The continued rearward movement of the strut under the influence of the coin causes the roller 66 to move out of engagement with latching surface 67 on the latch and when roller 66 clears the latching surface, the roller is free to move upwardly in the opening 65 in the latch.

When the roller is released from the latch, the actuator lever 61 and the strut are then free to rotate relative to each other and the actuator lever is swung in a clockwise direction (as seen in Fig. 7) about its pivot pin 62 by the action of an actuator spring 72 which returns the actuator lever and the pin 59 carried by the actuator lever to their initial position. This moves the rear end of the strut forward while the forward end of the strut swings upwardly under the influence of the inserted coin. The upward movement of the strut carries the forward end of the strut and the coin door above the coin and they then move forwardly over the top of the coin as shown in Fig. 9. As the coin door moves upwardly with the strut, the spring 57 tends to swing the coin door about its pivot on the strut and over the top of the coin.

In normal operation of the meter the coin is then released by the parker and the strut and coin door are returned to their initial position by the strut spring 69. The downward movement of the strut and coin door under the influence of the spring 69 projects the coin through the coin-receiving passageway and into the entrance of a coin chute 71. Upon return of the strut to its forward position, the latching surface 67 on the latch 63 is re-engaged with the roller 66 on the strut by the spring 68. It should be noted that if the coin strut is prevented or obstructed for any reason from returning to its initial position, it will not affect the subsequent operation of the meter so long as a coin is deposited in the meter and the actuator returns to normal position.

It will be apparent that various changes and modifications may be made in the embodiment of the invention

What is claimed is:

1. In a parking meter having a housing enclosing a meter mechanism, said housing having a slotted opening therein accessible to the parker and adapted for edgewise insertion of a coin therethrough, the combination which includes an actuating lever pivotally supported within the housing, a door-supporting member pivotally supported on the actuating lever, said member and said lever being pivoted at spaced points with the door-supporting member being movable upwardly in an arcuate path with respect to the slotted opening in the housing, a slot closing door supported on the door-supporting member, the door-supporting member normally supporting the door in slot closing position and being yieldably movable inwardly by pressure exerted on the door by insertion of a coin through the slotted opening in the housing, a latch engaging with the door-supporting member and restricting pivotal movement of said member relative to the actuating lever during movement of the door-supporting member under the influence of a coin, a stop positioned for engagement with the latch upon the movement of the door-supporting member a distance sufficient to permit the coin to pass through the slotted opening in the housing, said stop releasing the latch from engagement with the door-supporting member whereby the door-supporting member is permitted to swing upwardly on the actuating lever and over the top of the coin, and a spring acting on said door-supporting member, said spring independently urging said member toward door closing and latch engaging position.

2. In a mechanism for closing an entrance slot in a housing, the combination comprising a lever pivotally mounted within the housing, a strut pivotally mounted on said lever at a point spaced from the pivotal mounting thereof, said strut having a free end movable upwardly in an arcuate path with respect to said coin entrance slot in said housing, said free end normally being positioned opposite said entrance slot, and latch means engaging with and restricting pivotal movement of the strut relative to the lever during movement of the lever and the strut for a predetermined distance in one direction.

3. In a mechanism for closing an entrance slot in a housing, the combination as defined in claim 2 which includes a slot-closing door pivotally mounted on the free end of the strut, said door normally being yieldably held in engagement with an inner wall of the housing by the strut.

4. In a mechanism for closing an entrance slot in a housing, the combination as defined in claim 2 wherein the latch means includes a pivoted latch member, said latch member normally engaging with the strut and restricting pivotal movement of the strut relative to the pivoted lever, and a stop positioned for engagement with the latch member upon movement of the lever and strut for the predetermined distance in one direction, said stop thereby releasing the latch member from engagement with the strut.

5. In a mechanism for closing an entrance slot in a housing, the combination comprising a lever pivotally mounted within the housing, a strut pivotally mounted on said lever at a point spaced from the pivotal mounting of the lever, said strut having a free end movable upwardly in an arcuate path with respect to said coin entrance slot in said housing, said free end normally being positioned opposite said entrance slot, a slot-closing door pivotally supported on the free end of the strut and engaging with the inner wall of the housing adjacent the entrance slot, and latching means engaging with the strut and restricting pivotal movement of the strut relative to the lever during movement of the lever and the strut for a predetermined distance in one direction, said latching means including a pivoted latch member, said latch member normally engaging with the strut and restricting pivotal movement of the strut relative to the pivoted lever, and a stop positioned for engagement with the latch member upon movement of the lever and strut for the predetermined distance in one direction, said stop thereby releasing the latch member from engagement with the strut.

6. In a mechanism for closing an entrance slot in a housing, the combination as defined in claim 5 which includes a spring connected to the strut, said spring urging the strut and the door supported thereon toward the slot closing position, and a second spring connected to the lever and urging the lever in a direction opposite to said one direction.

7. In a parking meter having a housing enclosing a meter mechanism, said housing having a slotted opening therein accessible to the parker and adapted for edgewise insertion of a coin therethrough, the combination which includes a slot closing door located within the housing, an actuating lever pivotally mounted within the housing, a door-supporting member pivoted on the actuating lever, said member being movable upwardly in an arcuate path with respect to a coin entrance slot in the housing and normally supporting the door in slot closing position with the door yieldably pressing against the housing, said door-supporting member and said actuating member being pivoted at spaced points and being yieldably movable together in movement thereof away from the coin entrance slot, latching means engaging with the door-supporting member for restricting pivotal movement of said member relative to the actuating lever during said movement thereof, and means for releasing said latching means from engagement with the door-supporting member upon the movement of the door-supporting member a distance sufficient to permit the coin to pass through the coin entrance slot and thereby permitting the door-supporting member to pivot upwardly on the actuating lever.

8. In a parking meter having a housing enclosing a meter mechanism, said housing having a slotted opening therein accessible to the parker and adapted for edgewise insertion of a coin therethrough, the combination which includes a slot closing door located inside of the housing, an actuating lever pivotally mounted within the housing, a door-supporting member pivoted on the actuating lever, said member being movable upwardly in an arcuate path relative to a coin entrance slot in the housing and normally supporting the door in slot closing position, said actuating lever and door-supporting member being pivoted at spaced points and being yieldably movable together away from the coin entrance slot under the influence of a coin introduced through said slot, a latch engaging with the door-supporting member and restricting pivotal movement of said member relative to the actuating lever during said movement of said member and the actuating lever under the influence of a coin, means for releasing said latch from engagement with the door-supporting member, said means including a stop positioned for engagement with the latch upon movement of the door-supporting member a distance sufficient to permit the coin to pass through the coin entrance slot, and spring means engaging with the door-supporting member, said spring means urging the door-supporting member toward its initial position with respect to the actuating lever when the latch is released.

References Cited in the file of this patent

UNITED STATES PATENTS

| 2,370,480 | Moos | Feb. 27, 1945 |
| 2,613,792 | Broussard | Oct. 14, 1952 |

FOREIGN PATENTS

| 219,524 | Switzerland | June 1, 1942 |
| 560,534 | Great Britain | Apr. 7, 1944 |